US008873393B2

(12) United States Patent
Camps Mur et al.

(10) Patent No.: US 8,873,393 B2
(45) Date of Patent: Oct. 28, 2014

(54) METHOD FOR OPERATING A WIRELESS NETWORK AND A WIRELESS NETWORK

(75) Inventors: Daniel Camps Mur, Heidelberg (DE); Manil Gomony, Heidelberg (DE); Xavier Perez Costa, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 110 days.

(21) Appl. No.: 13/574,320

(22) PCT Filed: Jan. 20, 2010

(86) PCT No.: PCT/EP2010/000322
§ 371 (c)(1),
(2), (4) Date: Jul. 20, 2012

(87) PCT Pub. No.: WO2011/088844
PCT Pub. Date: Jul. 28, 2011

(65) Prior Publication Data
US 2012/0294150 A1    Nov. 22, 2012

(51) Int. Cl.
| | |
|---|---|
| *H04L 12/54* | (2013.01) |
| *H04W 28/06* | (2009.01) |
| *H04L 12/805* | (2013.01) |
| *H04L 29/02* | (2006.01) |
| *H04L 12/801* | (2013.01) |
| *H04W 84/12* | (2009.01) |

(52) U.S. Cl.
CPC .............. *H04L 47/10* (2013.01); *H04L 47/14* (2013.01); *H04W 28/06* (2013.01); *H04W 84/12* (2013.01); *H04L 47/365* (2013.01); *H04L 47/12* (2013.01)
USPC .......................................... 370/235; 370/345

(58) Field of Classification Search
None
See application file for complete search history.

(56) References Cited

U.S. PATENT DOCUMENTS

2007/0165590 A1*  7/2007  Kneckt et al. ................. 370/345

FOREIGN PATENT DOCUMENTS

| EP | 1 372 300 A1 | 12/2003 | |
|---|---|---|---|
| EP | 1372300 A1 * | 12/2003 | .............. H04L 12/56 |

OTHER PUBLICATIONS

International Search Report, dated Mar. 29, 2010, from corresponding PCT application.
Yuxia Lin et al., "Frame Aggregation and Optimal Frame Size Adaptation for IEEE 802.11n WLANs", Global Telecommunications Conference, Nov. 1, 2006, pp. 1-6.
Heng Xu et al., "Adaptive Congestion Control in Infrastructure Wireless LANs with Bounded Medium Access Delay", Mobility and Wireless Access Workshop, Jan. 1, 2002, pp. 44-49.

* cited by examiner

*Primary Examiner* — John Pezzlo
*Assistant Examiner* — Matthew Campbell
(74) *Attorney, Agent, or Firm* — Young & Thompson

(57) ABSTRACT

In order to allow an efficient use of data or frame aggregation techniques with real-time communications a method for operating a wireless network, especially a Wi-Fi technology based network, is described, wherein the network includes at least one wireless device for transmission of data and wherein the device may use a data or frame aggregation technique to provide an adjustable amount of aggregation. The method is characterized in that the amount of aggregation provided by the aggregation technique will be adjusted depending on a level of congestion in the network. Further, an according wireless network is described, preferably for carrying out the above mentioned method.

18 Claims, 3 Drawing Sheets

METHOD FOR OPERATING A WIRELESS NETWORK AND A WIRELESS NETWORK

BACKGROUND OF THE INVENTION

1. Field of the Invention

The present invention relates to a method for operating a wireless network, especially a Wi-Fi technology based network, wherein the network is comprising at least one wireless device for transmission of data and wherein the device may use a data or frame aggregation technique to provide an adjustable amount of aggregation. Further, the present invention relates to a wireless network, especially a Wi-Fi technology based network, wherein the network is comprising at least one wireless device for transmission of data and wherein the device may use a data or frame aggregation technique to provide an adjustable amount of aggregation.

2. Description of the Related Art

A method and an according wireless network of the above mentioned type are known from IEEE 802.11n standard, IEEE Standard for Information technology Telecommunications and information exchange between systems Local and metropolitan area networks, for example. The 802.11n technology, by providing higher data rates and several new capabilities at Layer 2, is expected to be the basis of the next generation WLAN networks. According to WFA (Wi-Fi-Alliance), more than 800 products from different market segments (Routers, laptops, printers, TVs, etc.) are already 802.11n certified.

The 802.11n technology offers a variety of physical layer mechanisms for achieving higher throughput and improved packet reception capability. Each 802.11n radio can have multiple transmit and receive antennas. Multiple spatial data streams can be transmitted at the same time, on the same channel, using different antennas, hence resulting in increased data rates. The data streams can be combined from multiple receivers using advanced signal processing techniques.

A key technical feature that 802.11n brings along in order to boost the performance of Wi-Fi networks, is a reduction in the MAC (Media Access Control) access overhead by means of frame aggregation techniques. In particular, two mandatory aggregation methods, namely A-MPDU (Aggregation of MAC Protocol Data Unit) and A-MSDU (Aggregation of MAC Service Data Unit), have been defined in 802.11n, that allow to embed several higher layer packets (MSDUs) into a single MAC frame (MPDU), and also several MAC frames into a single physical frame. The particular method that a Wi-Fi device could use to decide which frames to aggregate though, is not specified in the 802.11n standard in order to allow vendor differentiation.

The main reasoning behind the frame aggregation techniques included in 802.11n was to improve the throughput of a TCP (Transmission Control Protocol) transfer over Wi-Fi, where in a typical setting the buffer in the AP (Access Point) is filled with TCP packets that can be easily aggregated in order to increase efficiency. Notice that aggregation greatly improves performance in the case of TCP because many packets can be transmitted into the wireless medium with a single backoff access, instead of doing a backoff access per packet as in current Wi-Fi networks.

However, it is not clear whether real-time communications like Voice or Video can benefit from these aggregation techniques. The reason is that this type of communication typically generates data in a periodic fashion, e.g. 20 ms for a G.711 Voice codec, and have tight delay requirements. Therefore, in the case of real-time communications, data packets are usually sent as soon as possible, which reduces the possibility of building efficient aggregations.

BRIEF SUMMARY OF THE INVENTION

It is an object of the present invention to improve and further develop a method for operating a wireless network and an according network for allowing an efficient use of aggregation techniques in the case of real-time communications.

In accordance with the invention, the aforementioned object is accomplished by a method comprising the features of claim 1 and a network comprising the features of claim 20. According to claim 1 the method is characterized in that the amount of aggregation provided by the aggregation technique will be adjusted depending on a level of congestion in the network. According to claim 20 the network is characterized by means for adjusting the amount of aggregation provided by the aggregation technique depending on a level of congestion in the network.

According to the invention it has been recognized that by setting the amount of aggregation provided by the aggregation technique in relation to a level of congestion in the network an efficient use of aggregation techniques is possible, especially for real-time communications. In other words the amount of aggregation provided by the aggregation technique or techniques will be adjusted depending on a level of congestion in the network. The inventive method is providing a sensitive tool for influencing and optimizing the transmission of data in wireless devices. Important benefits of the proposed invention are an increase in network capacity, i.e. maximum number of real-time sessions that can be supported under a single AP, together with an improvement in Quality of Service (QoS) and power consumption in congested networks, especially Wi-Fi networks.

Preferably, the level of congestion will be measured directly or indirectly, and it can be measured independently by each device in the network. In addition, not all devices in the network are required to measure the level of congestion. With regard to a very simple and effective measurement the level of congestion could be measured by the at least or at least one wireless device or by another device of the network.

Within a preferred embodiment the aggregation technique or techniques could be used in the MAC (Media Access Control) layer. A significant reduction of overhead is possible in that case. The reason is that different higher layer packets are transmitted with common physical or MAC headers, hence reducing the amount of overhead and increasing efficiency. In addition, in contention based networks, aggregation techniques reduce congestion because devices contend less often to access the network (once per aggregate instead of once per data packet).

Further, with regard to a very effective use of the aggregation technique the amount of aggregation could be adjusted by the at least or at least one wireless device.

Preferably, the amount of aggregation will or might be increased when the level of congestion in the network increases. This could preferably be performed based on one or more definable thresholds. The result of increasing the amount of aggregation will be a reduction in contention overhead, which will decrease the amount of congestion in the network.

Further, when the level of congestion in the network decreases the amount of aggregation could be reduced in order to minimize the aggregation delay. This could preferably be performed based on one or more definable thresholds.

Within a preferred embodiment the at least or at least one wireless device could keep a service interval SI used to time or schedule the transmission of data or frames into the network. Such data or frames or data frames could belong to a real-time session, preferably received from an upper layer.

According to the above service interval SI data or frames or data frames could only be transmitted at times (t_last+SI), where t_last is the time from the last transmission. In addition, the available data frames at the time of transmission could be used to build an efficient aggregate.

Further, the at least or at least one wireless device could keep an estimate of the level of congestion in the network. Such an estimate could be preferably expressed in units of time. Within a preferred embodiment the estimate could be an access-delay. Such an access-delay could be measured as the time since a packet occupies the first position in the transmission queue until the time the packet can be sent out in a channel. Other valid estimates of the level of congestion could be derived measuring the amount of packets in the queues, the service period durations if the station is in power save mode, or the amount of collisions in the channel.

In order to maintain an accurate representation of the amount of congestion in the network, the estimate could be updated every time the wireless device attempts a new transmission. An EWMA (Exponential Weighted Moving Average) filter could be used to update this estimation every time a frame transmission is attempted.

In a next step, the value of the estimate could be compared with a pre-defined threshold at a definable time or time intervals or monitoring intervals. Depending on the result of such a comparison the value of the service interval SI could be adjusted for providing a suitable amount of aggregation. The value of the service interval SI could be dependent on the particular application running in the upper layers.

With regard to a very effective and simple realization of the method or of the network the previous comparison could be performed by the at least or at least one wireless device.

Preferably, the at least or at least one wireless device could be a Wi-Fi device, preferably an Access Point and/or a station.

By the proposed invention a method is provided that can be run independently in any Wi-Fi device—being either an AP or an STA (Station)—, and that is compatible with any existent Wi-Fi standard or future revisions thereof.

The proposed invention is providing a method to efficiently use particularly 802.11n frame aggregation techniques for real-time communications that can be implemented in any Wi-Fi device—stations or AP.

With the present invention it is possible to proactively bind the amount of aggregation used in the MAC layer with the level of congestion observed in the Wi-Fi network. The level of congestion can be independently sensed by any device in the network.

Important effects of the invention are as follows:
1. An increase in network capacity, i.e. number of concurrent real-time sessions that can be sustained under a single AP.
2. A reduction in the power consumption experienced by devices using the proposed invention—critical for instance in the case of Wi-Fi mobile terminals—, in congested Wi-Fi networks.
3. An improvement in the QoS experienced by Wi-Fi devices using the proposed invention in congested Wi-Fi networks.
4. The proposed invention can be used by a Wi-Fi device independently of whether the rest of devices in the network use it or not. However, the obtained benefits increase when the number of devices using the proposed method increases.
5. The implementation of the proposed method requires no hardware modifications, and it can be easily implemented with only modifications at the driver level, for example of an 802.11n compliant wireless card.

BRIEF DESCRIPTION OF THE DRAWINGS

There are several ways how to design and further develop the teaching of the present invention in an advantageous way. To this end, it is to be referred to the patent claims subordinate to patent claim 1 on the one hand, and to the following explanation of a preferred example of an embodiment of the invention, illustrated by the drawing on the other hand. In connection with the explanation of the preferred example of an embodiment of the invention by the aid of the drawing, generally preferred embodiments and further developments of the teaching will be explained. In the drawings FIG. 1 and are illustrating a preferred embodiment of a method for operating a FIG. 2 wireless network according to the invention

DETAILED DESCRIPTION OF THE PREFERRED EMBODIMENTS

Figure 1:
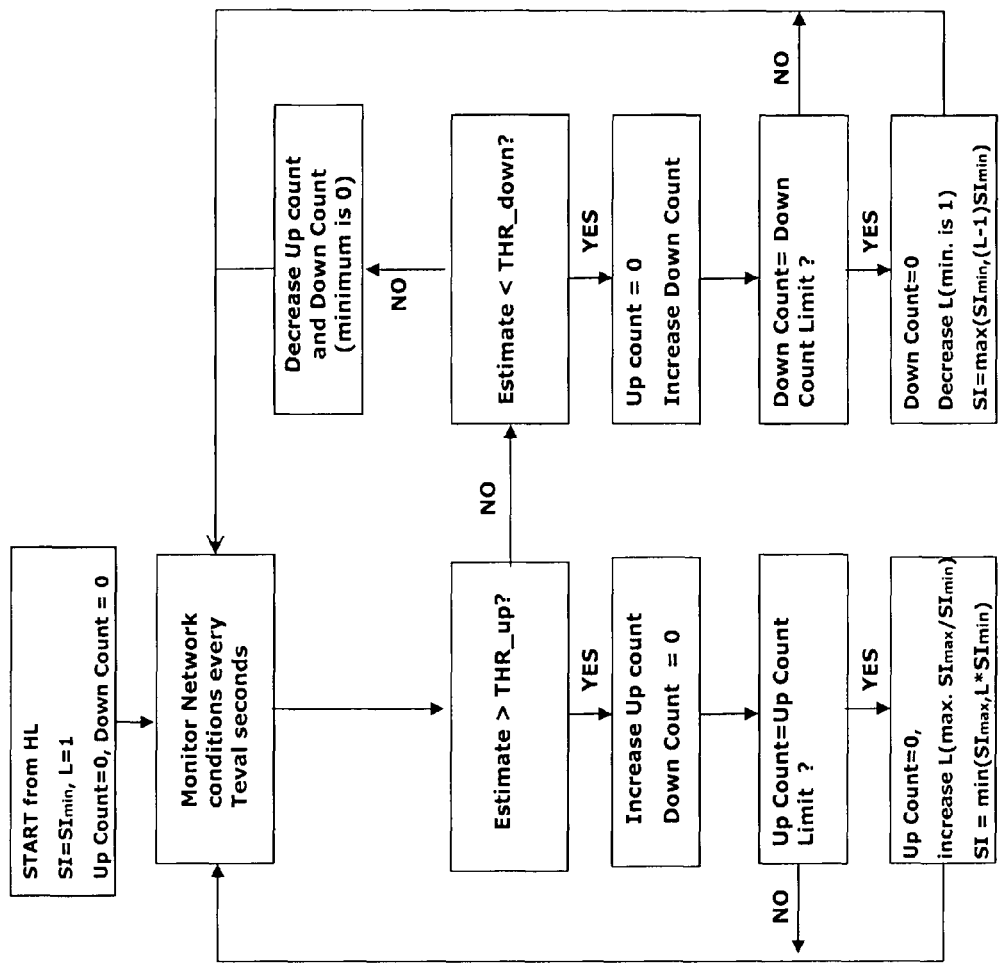
Figure 2:
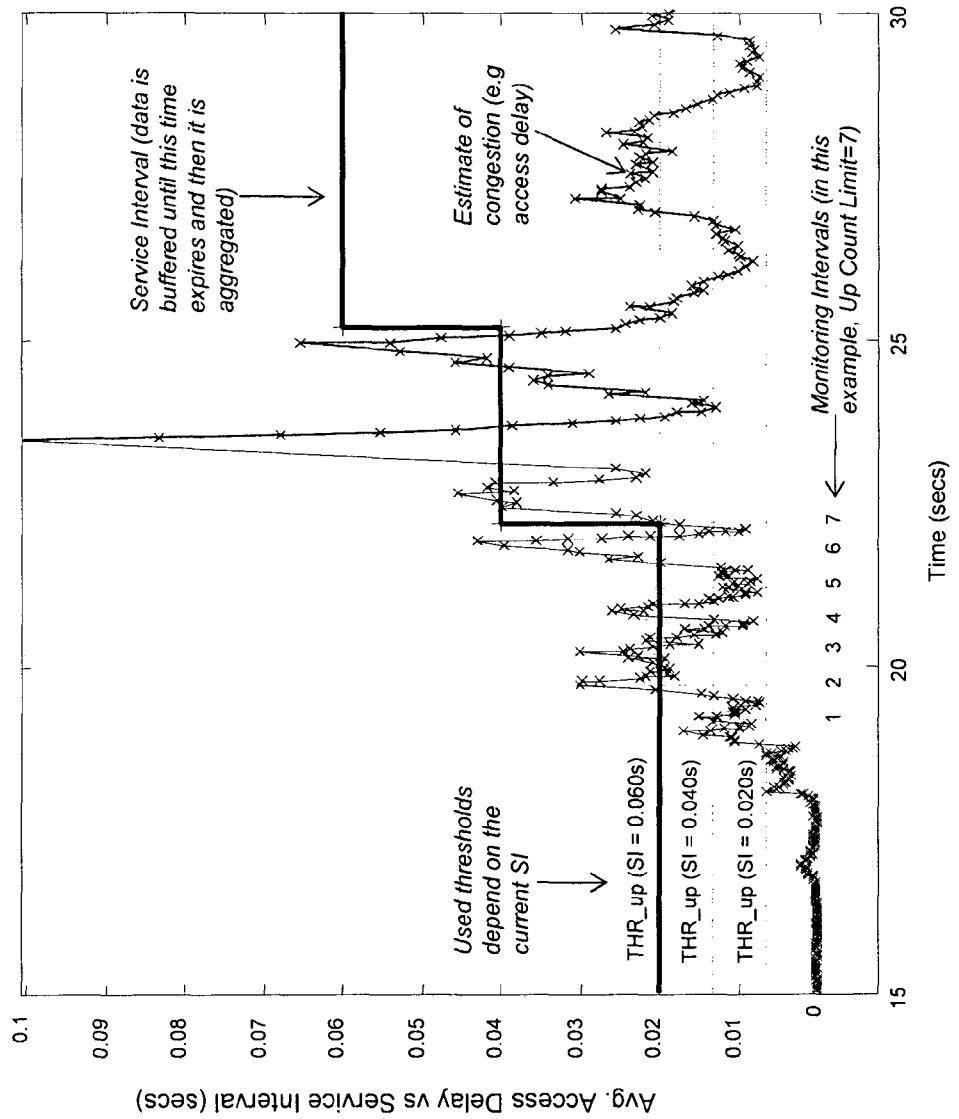

FIG. 1 and FIG. 2 are illustrating an embodiment of a method for operating a wireless network according to the invention. The discussed network is a Wi-Fi technology based network. The network is comprising wireless devices for transmission of data. The devices may use frame aggregation techniques for providing an adjustable amount of aggregation.

In order to provide an effective and simple use of aggregation techniques the amount of aggregation provided by the aggregation technique is adjusted depending on a level of congestion in the network.

When congestion in the network increases, a Wi-Fi device proactively increases the amount of aggregation in the MAC layer, in order to reduce contention overhead.

When congestion in the network decreases, a Wi-Fi device proactively reduces the amount of aggregation, in order to minimize the aggregation delay.

The embodiment of the invention is showing the following features:

A Wi-Fi device keeps in the MAC layer a service interval, SI, used to time the transmissions of data or frames belonging to a real-time session received from the upper layer. Thus, frames are only transmitted in the Wi-Fi network at times t_last+SI, where t_last is the time from the last transmission.

The data frames arriving for transmission between two transmission times, are efficiently aggregated and transmitted in the next available transmission time.

A Wi-Fi device also keeps in the MAC layer an estimate of the level of congestion in the network by measuring the access delay (an example of a possible time evolution of this estimate is depicted in FIG. 2). This estimate can be expressed in units of time, and is updated every time the device attempts a new frame transmission. There are many different ways to maintain such estimate, for instance an EWMA (Exponential Weighted Moving Average) filter.

At certain monitoring intervals (explicitly shown in FIG. 2), the Wi-Fi device compares the value of the access delay with a certain pre-defined threshold, THR_up, which can be made dependent on the application running in the upper layers and on the current service interval SI. If access_delay is above the specified threshold value for a certain number of times (Up Count Limit in FIG. 1), the Wi-Fi device increases the value of SI, e.g. in case of a Voice call it could increase SI from 20 ms to 40 ms. The maximum value of SI could be limited by a maximum allowable SI which would be dependent on the application, e.g. 100 ms in the case of Voice. This maximum value is referred to as $SI_{max}$ in FIG. 1.

An additional threshold, THR_down, is kept by the Wi-Fi device such that if the value of access_delay is below this threshold for a certain number of times (Down Count Limit in FIG. 1), the operating SI is reduced, e.g. from 40 ms to 20 ms in case of a Voice call. Notice that a minimum SI can also be defined depending on each application, for instance 20 ms in case of G.711. This minimum value is referred to as $SI_{min}$ in FIG. 1.

According to FIG. 2, when there is no congestion in the network a Wi-Fi device operates using a reduced SI that results in reduced aggregations but also small delays. However, when new stations join the network and the congestion level increases, the device applying the proposed method detects the increased level of congestion—by checking the access delay estimate against the defined thresholds—and increases the operating service intervals. Operating with an increased service interval results in bigger aggregations that reduce the contention to access the channel, and hence results in a decrease in the level of congestion in the network.

In order to evaluate the benefits of the invention a comparison of the performance that could be obtained with the invention against two alternative approaches existent in the state of the art has been performed using packet level simulations. The comparison has been performed in particular in terms of QoS (Quality of Service) and power consumption. The two approaches in the state of the art are:

State of the art-1 (IEEE 802.11.2007 standard, IEEE 802.11n standard, IEEE Standard for Information technology Telecommunications and information exchange between systems Local and metropolitan area networks. Specific requirements. Part 11: Wireless LAN Medium Access Control (MAC) and Physical Layer (PHY) Specifications.): Under this approach Wi-Fi devices transmit in the uplink according to the nominal rate used by the real-time codec, e.g. 20 ms in the case of Voice. However, downlink transmissions are performed only once every 100 ms, the Beacon interval. Wi-Fi devices can hence sleep when they have no uplink data to send or between Beacons. This approach corresponds to the 802.11 standard power save mode protocol.

State of the art-2 (Wi-Fi Alliance, WMM (including WMM-PowerSave) specification. Version 1.1.): Under this approach real-time Wi-Fi devices send uplink and downlink frames at the rate required by the application codec, e.g. 20 ms in the case of Voice. Uplink and downlink transmissions are performed together, and the device sleeps between transmissions in order to save power.

Figure 3:
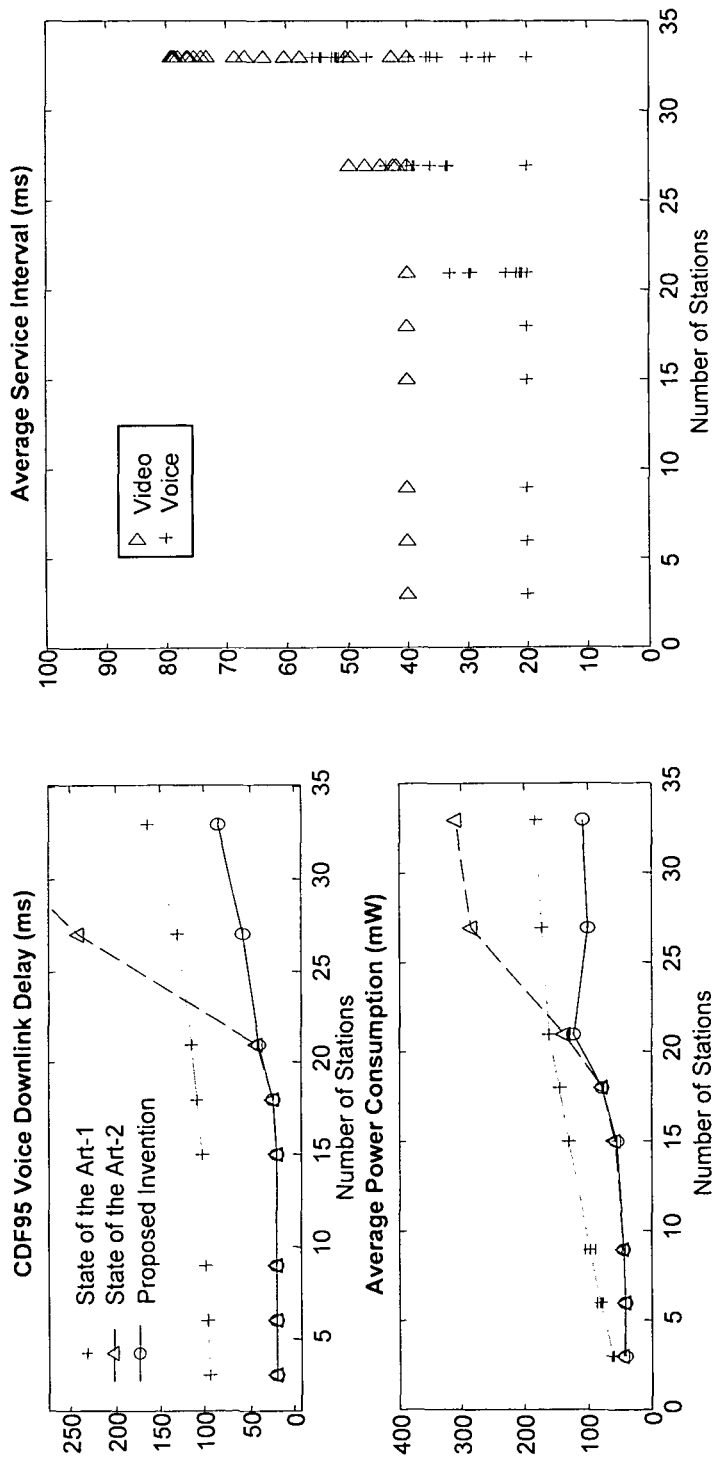
FIG. 3 is illustrating the performance obtained with two approaches in the state of the art in terms of QoS—downlink delay—and power consumption, as compared with the preferred embodiment of the invention.

FIG. 3 is illustrating the performance obtained with the two approaches in the state of the art in terms of QoS—downlink delay—and power consumption as compared with the invention.

As observed in FIG. 3, State of the art-1 results in bigger delays and higher power consumption when the network is not congested. Instead, State of the art-2 decreases delay and power consumption when the network is not congested by transmitting more often (and in an uncoordinated way). However, when the network starts to be congested, State of the art-2 quickly degrades because there are too many stations sending frames at too short intervals. The proposed invention uses a small SI when the congestion in the network is low, hence obtaining the same performance than the State of the art-2 approach, and reduces congestion by increasing the service interval (and therefore using bigger aggregations) when the network starts to be congested (after 20 stations), hence outperforming both state of the art approaches. The figure on the right depicts how the Wi-Fi stations using the proposed invention increase the used service interval as the congestion in the network increases.

Finally, notice that the PHY innovations included in 802.11n significantly improve range. Therefore a certain area—campus, enterprise, hot spots, etc.—will likely be covered with less 802.11n APs, than 802.11b/g APs. Better coverage can result in an increase of the number of stations associated to a single AP, hence increasing the probability of experiencing congestion, and increasing the relevance of the benefits of the proposed invention with respect to the state of the art.

The above mentioned embodiment allows a Wi-Fi device to efficiently manage the trade-off between QoS and power consumption. The result is an increase in the capacity of a Wi-Fi network. The method can be used independently in any Wi-Fi device and is standard compliant.

Many modifications and other embodiments of the invention set forth herein will come to mind the one skilled in the art to which the invention pertains having the benefit of the teachings presented in the foregoing description and the associated drawings.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a wireless network, the wireless network being a Wi-Fi technology based network, the wireless network including at least one wireless device for transmission of data, the method comprising:
   using a data or frame aggregation technique to provide an adjustable amount of aggregation, the amount of aggregation provided by the aggregation technique being adjusted depending on a level of congestion in the wireless network, the wireless network keeping a service interval (SI) used to time the transmission of data or frames;
   only transmitting current data or frames at time=(t_last+SI), t_last being a time from a last transmission of data or frames; and
   increasing the service interval (SI) when the congestion in the wireless network increases.

2. The method according to claim 1, wherein the level of congestion will be measured directly or indirectly.

3. The method according to claim 1, wherein the level of congestion will be measured by the one wireless device or by another device of the network.

4. The method according to claim 1, wherein the aggregation is used in the Media Access Control (MAC) layer.

5. The method according to claim 1, wherein the amount of aggregation is adjusted by the at least one wireless device.

6. The method according to claim 1, wherein the amount of aggregation is increased when the level of congestion in the network increases based on one or more definable thresholds.

7. The method according to claim 1, wherein the amount of aggregation is reduced when the level of congestion in the network decreases based on one or more definable thresholds.

8. The method according to claim 1, wherein the current data or frames belong to a real-time session received from an upper layer.

9. The method according to claim 1, wherein the current frames to be transmitted at time t_last+SI are used to build an efficient aggregate.

10. The method according to claim 1, wherein the at least one wireless device keeps an estimate of the level of congestion in the network.

11. The method according to claim 10, wherein the estimate is expressed in units of time.

12. The method according to claim 10, wherein the estimate is an access-delay.

13. The method according to claim 10, wherein the estimate is updated every time the wireless device attempts a new data or frame transmission.

14. The method according to claim 10, wherein the estimate is updated using an Exponential Weighted Moving Average (EWMA) filter.

15. The method according to claim 10, wherein the value of the estimate will be compared with a pre-defined threshold at a definable time or time intervals or monitoring intervals.

16. The method according to claim 15, wherein the comparison will be performed by the at least one wireless device.

17. The method according to claim 1, wherein the at least one wireless device is a Wi-Fi device, an Access Point, or a station.

18. A wireless network configured to perform the method according to claim 1, wherein the wireless network is the Wi-Fi technology based network, the wireless network comprising:

the at least one wireless device for transmission of data; and means for adjusting the amount of aggregation provided by the aggregation technique depending on the level of congestion in the network, wherein the wireless network keeps the service interval (SI) used to time the transmission of data or frames, the device is configured to transmit current data or frames only at the time=(t_last+SI), t_last being the time from the last transmission of data or frames, the service interval (SI) being increased when the congestion in the wireless network increases.

\* \* \* \* \*